Patented Aug. 19, 1952

2,607,789

UNITED STATES PATENT OFFICE 2,607,789

N-ALPHA MERCAPTO ACETYL AMINO ARYL COMPOUNDS

Ulrich Weiss, Kew Gardens, N. Y., assignor to Endo Products, Inc., Richmond Hill, N. Y., a corporation of New York No Drawing. Application December 18, 1947, Serial No. 792,626

5 Claims. (Cl. 260—430)

This invention relates to novel compositions for effecting biological responses; and in particular is directed to biologically active compositions comprising at least one active ingredient which is a compound having the type formula:

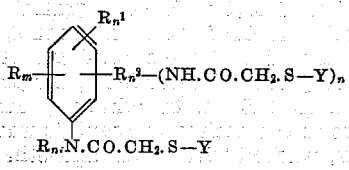

wherein: R, the substituent for hydrogen, is a member of the group consisting of alkyl, aryl, aralkyl;

$R^1$, the substituent for hydrogen, is a member of the group consisting of alkoxy, aryloxy, nitro and halo;

$R^2$, the substituent for hydrogen, is aryl;

Y represents one atom of a monovalent, or one equivalent of a polyvalent heavy metal;

The subscript $m$ is a member of the series 0 to 3 inclusive;

The subscript $n$ is a member of the series 0 to 1 inclusive; and wherein the compound contains at least one of the substituents designated by the symbols R, $R^1$, $R^2$, or the group ($NH.CO.CH_2.S$—).

These metal mercaptides may be prepared from their parent thiol compounds having the type formula

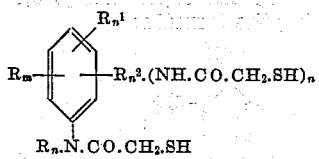

wherein the symbols R, $R^1$, and $R^2$, and the subscripts $m$ and $n$ have the same meaning as above described, and the parent thiol contains at least one of the substituents designated by the symbols R, $R^1$, $R^2$ and the group ($NH.CO.CH_2.SH$).

The chemically reactive mercapto structure of the foregoing thiol compounds allowed for the preparation of:

(a) Mercaptides of various metals, as for example, those of silver, mercury, gold, iron, nickel and the like.

(b) A wide variety of compounds embodying many diverse types of organic radicals as substituents for the hydrogen of the mercapto group.

(c) A variety of compositions for biological application embodying the known effects, as hereinafter outlined, of such mercaptides as mentioned in sub-paragraph (a) supra, in combination with each other or with either the parent mercapto compounds or their derivatives as indicated in sub-paragraph (b) supra.

Accordingly, among the purposes and objects of this invention may be noted the provision of a series of new metal mercaptides of the type formula above indicated.

Among the specific applications of these metal mercaptides it is to be noted that the silver compounds are antiseptics; that the auro compounds are valuable in the treatment of arthritis; and that the iron, copper and cobalt compounds are valuable for their influence on the hematopoietic system.

Furthermore, it is to be noted that the parent mercapto compounds possess the property of modifying proteinaceous materials by altering the character thereof so as to make them adaptable for further chemical treatment or physical manipulation. Additionally, the mercapto compounds are of value as anti-oxidants in protecting such compounds as epinephrine, vitamin A and other products which are prone to undergo oxidation in the presence of air or oxygen.

The mercapto compounds and their derivatives may also be useful as detoxicants for heavy metals in the manner akin to that of sulfhydryl compounds. For this purpose they may be used in compositions in which they are the only active ingredient or in compositions such as are encompassed by those of sub-paragraph (c) supra.

The parent mercapto compounds may conveniently be prepared by the interaction of thiocyano acetic acid with a selected aromatic amine, namely, one having the particularly desired substituent or substituents. This inter-action is brought about by the dissolution of the selected amine in an acid medium, followed by the addition thereto of the sodium salt of thiocyano acetic acid, with the resultant formation of the S-carbamyl derivative of the desired N-arylamide of mercapto acetic acid. These S-carbamyl compounds may in turn be converted into the desired mercapto compounds by means of heat or alkali, preferably hot dilute ammonia. The mercapto compounds are converted to the corresponding metal mercaptides by inter-action with an appropriate reagent. The mercapto compounds may also be converted into their corresponding disulfides by the action of oxidizing agents, as for example, iodine.

This invention accordingly comprises procedures and features of the various compositions and compounds which will be typified by those set forth in the following examples and the scope of which will be indicated in the appended claims.

*Example 1*

N-alpha auro mercapto acetyl N-methyl aniline having the formula:

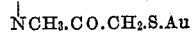
NCH₃.CO.CH₂.S.Au

A solution of 0.01 mole of potassium auri bromide, KAuBr.4, in 95% ethanol, is treated with sulfur dioxide. To the resulting solution, containing gold in the monovalent state, there is added an alcoholic solution of 1.83 grams of N-alpha mercapto acetyl N-methyl aniline having the formula C₆H₅.NCH₃.CO.CH₂.SH. The gold mercaptide having the formula above indicated appears as a white precipitate. The mixture is diluted with water and the compound is collected on a filter and washed thoroughly with water and alcohol. After drying in vacuo over phosphorus pentoxide it forms an off-white powder.

*Example 2*

(a) N-alpha auro mercapto acetyl ortho toluidine having the formula:

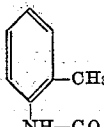
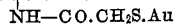
NH—CO.CH₂S.Au

A solution of 0.01 mole of potassium auri bromide in 95% ethanol is treated with sulfur dioxide as described in Example 1 and to the resultant solution containing the gold in the monovalent state there is added an alcoholic solution of 1.83 grams of N-alpha mercapto acetyl ortho toluidine. The gold mercaptide having the above formula appears as a whitish precipitate. The mixture is diluted with water and the mercaptide collected on a filter, washed, and subsequently dried in accordance with the procedure described in Example 1.

By like procedures, using N-alpha mercapto acetyl meta toluidine and N-alpha mercapto acetyl para toluidine as the respective starting materials, there are obtained:

N-alpha auro mercapto acetyl meta toluidine,
N-alpha auro mercapto acetyl para toluidine.

(b) The N-alpha cupro mercapto acetyl ortho toluidine having the formula

o—CH₃.C₆H₄.NH.CO.CH₂.S.Cu is prepared as follows. A solution of monovalent copper is prepared following essentially the method of Ilosvay von Nagy-Ilosva (Berichte 32, 2698 (1899)), cf. Houben, Die Methoden der Organischen Chemie, 3d edition, 1925, vol. 2, p. 1027. 0.02 mole (4.99 grams) of cupric sulfate, CuSO₄.5H₂O, is dissolved in 20 cc. of water. 15 cc. of concentrated ammonia is added thereto, followed by the addition of 15 grams of hydroxylamine hydrochloride. The mixture is shaken rapidly. It effervesces, and the deep blue liquid turns colorless or faintly blue within a short time.

0.02 mole (4.5 grams) of the N-alpha carbamyl mercapto acetyl ortho toluidine,

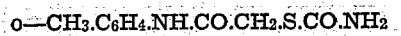
o—CH₃.C₆H₄.NH.CO.CH₂.S.CO.NH₂ is heated under reflux on a steam cone with a mixture of 15 cc. of water and 15 cc. of concentrated ammonia. After 10 minutes, the solution is filtered by suction into a flask containing excess ice. To this filtrate there is immediately added the cuprous solution described above, and the desired cuprous mercaptide having the above formula, comes down a yellow amorphous precipitate. It is filtered with suction, washed well with dilute ammonia, followed by water, and finally dried in vacuo over phosphorus pentoxide. The dried product is a yellow powder which is very soluble in chloroform.

A cuprous solution is also prepared from cupric sulfate by reduction with sodium bisulfite in aqueous solution containing sodium chloride. To the cuprous solution thus formed, there is added an alcoholic solution of N-alpha mercapto acetyl ortho toluidine, o—CH₃.C₆H₄.NH.CO.CH₂SH, whereby the cuprous mercaptide is precipitated, and worked up as described above.

(c) The mercuric mercaptide of N-alpha mercapto acetyl ortho toluidine having the formula

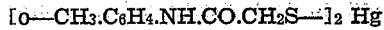
[o—CH₃.C₆H₄.NH.CO.CH₂S—]₂ Hg is prepared as follows:

A solution of 0.01 mole (2.72 grams) of mercuric chloride, HgCl₂, in 20 cc. of ethanol, is added to a solution of 0.02 mole (3.64 grams) of N-alpha-mercaptoacetyl o-toluidine, the product of (a) supra, in 140 cc. of ethanol. The white precipitate of the desired mercaptide was filtered by suction, washed with water and ethanol, and dried in vacuo over phosphorus pentoxide.

(d) The nickelous of N-alpha mercapto acetyl para toluidine having the formula

[p-CH₃.C₆H₄.NH.CO.CH₂S—]₂ Ni is prepared as follows: 0.01 mole (2.91 grams) of nickel nitrate, Ni(No₃)₂.6H₂O, is dissolved in 30 cc. of ethanol, and added to a solution of 0.02 mole (3.62 grams) of the parent thiol compound dissolved in 150 cc. of ethanol. To the resulting brown solution there is added 5 cc. of a mixture (1:1) of concentrated ammonia and water. The resulting brown precipitate is filtered with suction, washed well with water and alcohol, and dried in vacuo over phosphorus pentoxide.

*Example 3*

N-alpha auro mercapto acetyl-3,4-di-methyl aniline having the formula:

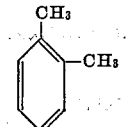
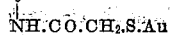
NH.CO.CH₂.S.Au (a) 0.1 mole of 3,4-di-methyl aniline (asymmetrical ortho xylidine) is suspended in 100–200 cc. of water at room temperature and enough hydrochloric acid (1:1) is added to give a clear solution. Then a solution of 0.1 mole (15.7 grams) of sodium thiocyano acetate is added. Crystallization of the N-carbamyl mercapto acetyl-3,4-di-methyl aniline

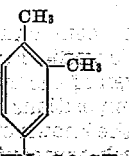
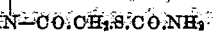
HN—CO.CH₂.S.CO.NH₂ is allowed to proceed for about two days at room temperature, after which time the compound is filtered by suction, washed well with dilute hydrochloric acid and water, and dried. The compound may be recrystallized, if desired, from methanol containing a small quantity of hydrochloric acid.

(b) 10 grams of the product of (a) supra are refluxed for a few minutes with 60 cc. of a mixture of equal volumes of water and concentrated ammonia. The liquid is filtered at once with suction into a flask containing excess ice. The filtrate is acidified immediately with dilute hydrochloric acid. The desired mercapto compound

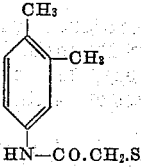

appears as a white precipitate which is collected on a Buchner funnel and washed well with water containing a small amount of hydrochloric acid. It is dried in vacuo over phosphorus pentoxide and may be recrystallized, if desired, from very dilute hydrochloric acid.

(c) The N-alpha auro mercapto acetyl-3,4-di-methyl aniline is prepared by the addition of an alcoholic solution of the above mercapto compound, the product of (b) supra, in slight excess over the theoretical amount, to a gold solution prepared as described in Example 1.

(d) The mercapto compound, product of (b) supra, is also converted to the corresponding disulfide

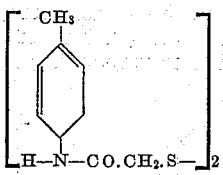

by the addition, to its alcoholic solution, of a very slight excess of aqueous iodine solution (iodine in potassium iodide). The excess iodine is removed at once by the addition of an aqueous solution of sodium thiosulfate, and the disulfide is precipitated by the addition of water. It is recrystallized from ethanol or glacial acetic acid.

(e) The N-alpha cupro mercapto acetyl-3,4-dimethyl aniline having the formula,

(CH₃)₂.C₆H₃.NH.CO.CH₂S.Cu is prepared as follows: 0.03 mole (5.85 grams) of the parent thiol compound, the product of (b) supra, is dissolved in 100 cc. of ethanol solution to which is added a solution of 0.01 mole (1.70 grams) of cupric chloride (CuCl₂.2H₂O) in 10 cc. of ethanol. A yellow precipitate is formed consisting of a mixture of the above cuprous mercaptide and 1 molar equivalent of the disulfide, the product of (d) supra. The precipitate is allowed to stand overnight in the refrigerator. It is then filtered with suction, washed well with ethanol, and extracted four times with boiling acetone to remove the last traces of the disulfide. The cuprous mercaptide is dried in vacuo over phosphorus pentoxide. It is a greenish yellow powder.

*Example 4*

N-alpha auro mercapto acetyl-2,6-di-methyl aniline having the formula

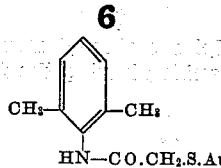

(a) The N-alpha carbamyl mercapto acetyl-2,6 di-methyl aniline having the formula

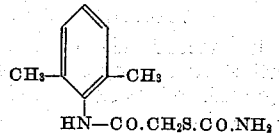

is prepared in accordance with the general method described in Example 3(a) except that 2,6-di-methyl aniline (vic.m-xylidine) is used as the initial starting material for inter-action with the sodium thiocyano acetate.

(b) In accordance with the general procedure described in Example 3(b) the carbamyl compound of this Example (a) supra is converted into the N-alpha mercapto acetyl 2,6-di-methyl aniline having the formula

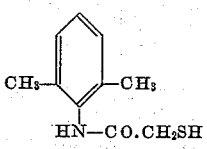

(c) In accordance with the procedure described in Example 3(c) the mercapto compound, the product of (b) supra, is converted into the N-alpha auro mercapto acetyl - 2,6 - di - methyl aniline.

(d) In accordance with the procedure described in Example 3(d) the mercapto compound of this example, the product of (b) supra, is converted into the corresponding disulfide having the formula

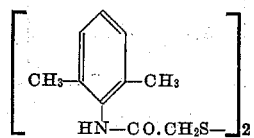

(e) The N-alpha argento mercapto acetyl-6,6-dimethyl aniline having the formula

(CH₃)₂.C₆H₃.NH.CO.CH₂.S.Ag is prepared as follows: 0.01 mole (1.95 grams) of the parent thiol compound, the product of (b) supra, is dissolved in 100 cc. of ethanol and to the solution there is added a solution of 0.01 mole (1.70 grams) of silver nitrate, AgNO₃, in 10 cc. of water. The yellow precipitate of the silver mercaptide having the above formula is filtered with suction and washed well with water and ethanol, protecting it from light as much as possible, after which it is dried in vacuo over phosphorus pentoxide.

*Example 5*

N-alpha auro mercapto acetyl amino mesitylene (N-alpha auro mercapto acetyl - 2,4,6 - trimethyl aniline) having the formula

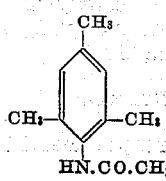

(a) The N-alpha carbamyl mercapto acetyl-2,4,6-trimethyl aniline having the formula

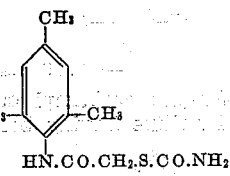

is prepared in accordance with the general method described in Example 3(a) except that 2,4,6-trimethyl aniline is used as the initial starting material for inter-action with the sodium thiocyano acetate.

(b) In accordance with the general procedure described in Example 3(b), the carbamyl compound of this example, (a) supra, is converted into the N-alpha mercapto acetyl - 2,4,6 - trimethyl aniline having the formula

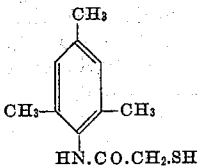

(c) In accordance with the procedure described in Example 3(c) the mercapto compound, the product of (b) supra, is converted into the N-alpha auro mercapto acetyl - 2,4,6 - trimethyl aniline.

(d) In accordance with the procedure described in Example 3(d), the mercapto compound of this example, the producing of (b) supra, is converted into the corresponding disulfide having the formula

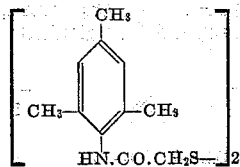

Example 6

N-alpha auro mercapto acetyl pseudo cumidine (N-alpha auro mercapto acetyl - 2,4,5 - trimethyl aniline) having the formula

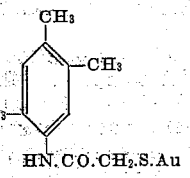

To a solution containing gold in the monovalent state as prepared in accordance with Example 1, there is added an alcoholic solution of 2.12 grams of N-alpha auro mercapto acetyl - 2,4,5 - trimethyl aniline having the formula $$C_6H_2(CH_3)_3.NH.CO.CH_2.SH$$

The gold mercaptide having the formula above indicated appears as a whitish precipitate. This mercaptide may be collected, washed, and subsequently dried in vacuo over phosphorus pentoxide as described in Example 1.

Example 7

N-alpha auro mercapto acetyl N-ethyl aniline having the formula

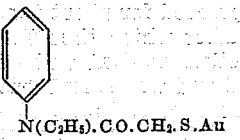

(a) The N-alpha carbamyl mercapto acetyl N-ethyl aniline having the formula

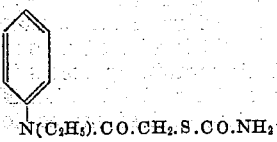

is prepared in accordance with the general method described in Example 3(a) except that N-ethyl aniline is used as the initial starting material for inter-action with the sodium thiocyano acetate.

(b) In accordance with the general procedure described in Example 3(b) the carbamyl compound of this Example (a) supra, is converted into the N-alpha mercapto acetyl N-ethyl aniline having the formula

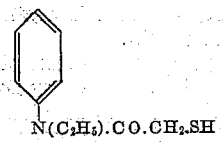

(c) In accordance with the procedure described in Example 3(c), the mercapto compound, the product of (b) supra, is converted into the N-alpha auro mercapto acetyl N-ethyl aniline.

(d) In accordance with the procedure described in Example 3(d) the mercapto compound of this example, the product of (b) supra, is converted into the corresponding disulfide having the formula

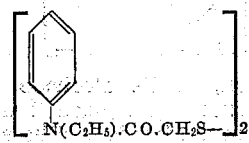

Example 8

N-alpha auro mercapto acetyl N-ethyl ortho toluidine having the formula

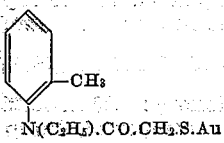

(a) The N-alpha carbamyl mercapto acetyl N-ethyl ortho toluidine having the formula

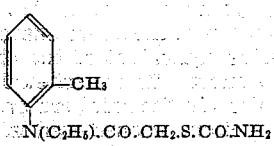

is prepared in accordance with the general method described in Example 3(a) except that N-ethyl ortho toluidine is used as the initial starting material for inter-action with the sodium thiocyano acetate.

(b) In accordance with the general procedure described in Example 3(b), the carbamyl compound of this example, the product of (a) supra, is converted into the N-alpha mercapto acetyl N-ethyl ortho toluidine having the formula

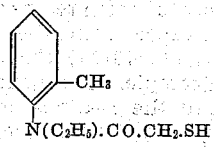

N(C₂H₅).CO.CH₂.SH (c) In accordance with the procedure described in Example 3(c), the mercapto compound, the product of (b) supra, is converted into the N-alpha auro mercapto acetyl N-ethyl ortho toluidine.

(d) In accordance with the procedure described in Example 3(d), the mercapto compound of this example, the product of (b) supra, is converted into the corresponding disulfide having the formula

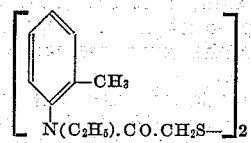

By like procedures, using the N-ethyl meta toluidine and the N-ethyl para toluidine as the respective starting materials, there are obtained:

N-alpha carbamyl mercapto acetyl N-ethyl meta toluidine having the formula

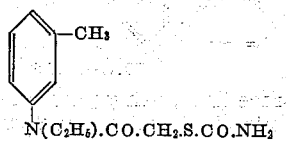

N(C₂H₅).CO.CH₂.S.CO.NH₂

N-alpha mercapto acetyl N-ethyl meta toluidine.

N-alpha auro mercapto acetyl N-ethyl meta toluidine.

N-alpha di-thio di-acetyl bis N-ethyl meta toluidine.

N-alpha carbamyl mercapto acetyl N-ethyl para toluidine having the formula

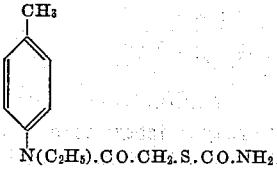

N(C₂H₅).CO.CH₂.S.CO.NH₂

N-alpha mercapto acetyl N-ethyl para toluidine.

N-alpha auro mercapto acetyl N-ethyl para toluidine.

N-alpha di-thio di-acetyl bis N-ethyl para toluidine.

*Example 9*

N-alpha auro mercapto acetyl N-methyl ortho ethyl amino benzene having the formula

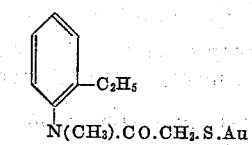

N(CH₃).CO.CH₂.S.Au (a) The N-alpha carbamyl mercapto acetyl N-methyl ortho ethyl amino benzene having the formula

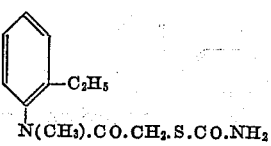

N(CH₃).CO.CH₂.S.CO.NH₂ is prepared in accordance with the general method described in Example 3(a) except that N-methyl ortho ethyl amino benzene is used as the initial starting material for inter-action with the sodium thiocyano acetate.

(b) In accordance with the general procedure described in Example 3(b), the carbamyl compound of this example, the product of (a) supra, is converted into the N-alpha mercapto acetyl N-methyl ortho ethyl amino benzene having the formula

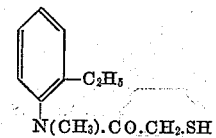

N(CH₃).CO.CH₂.SH (c) In accordance with the procedure described in Example 3(c), the mercapto compound, the product of (b) supra, is converted into the N-alpha auro mercapto acetyl N-methyl ortho ethyl amino benzene.

(d) In accordance with the procedure described in Example 3(d), the mercapto compound of this example, the product of (b) supra, is converted into the corresponding disulfide having the formula

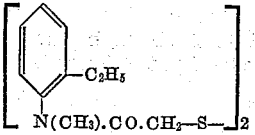

By like procedures, using the N-methyl meta ethyl amino benzene and the N-methyl para ethyl amino benzene as the respective starting materials, there are obtained:

N-alpha carbamyl mercapto acetyl N-methyl meta ethyl amino benzene having the formula

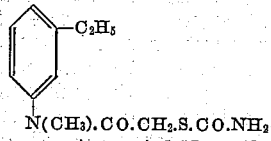

N(CH₃).CO.CH₂.S.CO.NH₂

N-alpha mercapto acetyl N-methyl meta ethyl amino benzene.

N-alpha auro mercapto acetyl N-methyl meta ethyl amino benzene.

N-alpha di-thio di-acetyl bis N-methyl meta ethyl amino benzene.

N-alpha carbamyl mercapto acetyl N-methyl para ethyl amino benzene having the formula

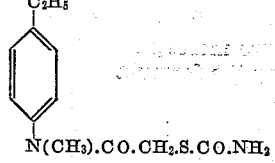

N(CH₃).CO.CH₂.S.CO.NH₂

N-alpha mercapto acetyl N-methyl para ethyl amino benzene.

N-alpha auro mercapto acetyl N-methyl para ethyl amino benzene.

N-alpha di-thio di-acetyl bis N-methyl para ethyl amino benzene.

*Example 10*

N-alpha auro mercapto acetyl N-benzyl aniline having the formula

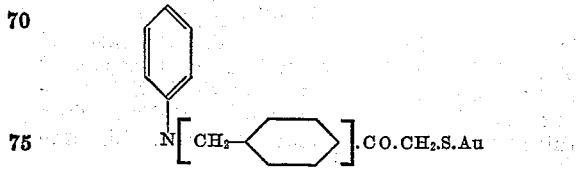

(a) 0.1 mole of N-benzyl aniline is dissolved at room temperature in a small amount of glacial acetic acid and an aqueous solution of 0.1 mole (15.7 grams) of sodium thiocyano acetate is added thereto. Water is then added to the mixture so as to dilute the same to the minimum concentration of acetic acid which holds the benzyl aniline in solution. Crystallization of the N-alpha carbamyl mercapto acetyl N-benzyl aniline having the formula

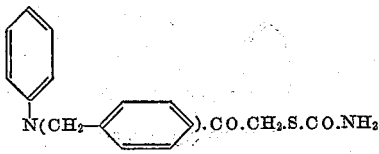

starts at room temperature only after one to two weeks. It is allowed to proceed for several weeks, after which time the product is filtered by suction, washed with dilute acetic acid, followed by water, and dried in vacuo over phosphorus pentoxide. It is purified by recrystallization from ethanol containing a few drops of hydrochloric acid.

(b) In accordance with the general procedure described in Example 3(b), the carbamyl compound of this example, the product of (a) supra, is converted into the N-alpha mercapto acetyl N-benzyl aniline having the formula

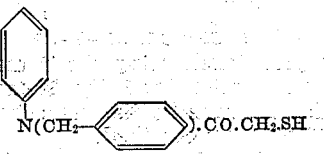

(c) In accordance with the procedure described in Example 3(c), the mercapto compound, the product of (b) supra, is converted into the N-alpha auro mercapto acetyl N-benzyl aniline.

(d) In accordance with the procedure described in Example 3(d), the mercapto compound of this example, the product of (b) supra, is converted into the corresponding disulfide having the formula

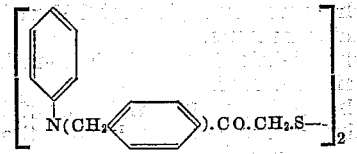

Example 11

N-alpha auro mercapto acetyl ortho amino biphenyl having the formula

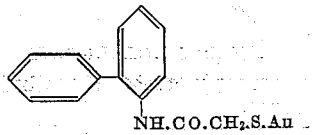

(a) The N-alpha carbamyl mercapto acetyl ortho amino biphenyl having the formula

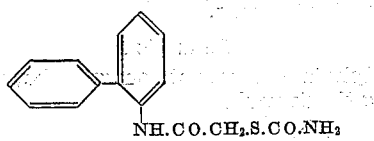

is prepared in accordance with the general method described in Example 10(a) except that ortho amino biphenyl is used as the initial starting material for inter-action with the sodium thiocyano acetate. Crystallization of this carbamyl mercapto compound commences within a short time and is allowed to proceed to completion for about two days at room temperature.

(b) In accordance with the procedure described in Example 10(b), the carbamyl compound of this Example, the product of (a) supra, is converted into the N-alpha mercapto acetyl ortho amino biphenyl having the formula

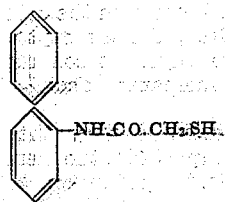

(c) In accordance with the procedure described in Example 10(c), the mercapto compound, the product of (b) supra, is converted into the N-alpha auro mercapto acetyl ortho amino biphenyl.

(d) In accordance with the procedure described in Example 10(d), the mercapto compound of this example, the product of (b) supra, is converted into the corresponding disulfide having the formula

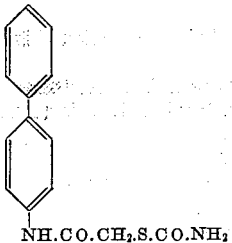

By like procedures, using para amino biphenyl and meta amino biphenyl as the respective starting materials, there are obtained N-alpha carbamyl mercapto acetyl para amino biphenyl having the formula

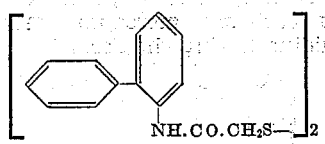

N-alpha mercapto acetyl para amino biphenyl.
N-alpha auro mercapto acetyl para amino biphenyl.
N-alpha di-thio di-acetyl bis para amino biphenyl.
N-alpha carbamyl mercapto acetyl meta amino biphenyl having the formula

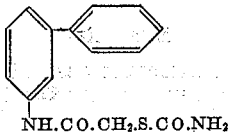

N-alpha mercapto acetyl meta amino biphenyl.
N-alpha auro mercapto acetyl meta amino biphenyl.
N-alpha di-thio di-acetyl bis meta amino biphenyl.

(e) The N-alpha cupro mercapto acetyl ortho amino biphenyl having the formula

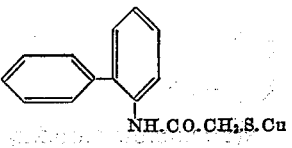

is prepared from the parent thio compound, the product of (b) supra, by the interaction with cupric chloride in ethanol in accordance with the method described in Example 3(e). The product is a greenish yellow powder comparatively soluble in ethanol.

Example 12

N-alpha auro mercapto acetyl meta nitraniline having the formula

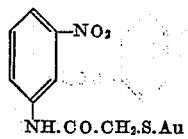

(a) The N-alpha carbamyl mercapto acetyl meta nitraniline having the formula

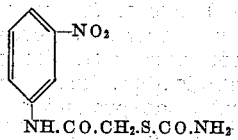

is prepared in accordance with the general method described in Example 11(a) except that meta nitraniline is used as the initial starting material for inter-action with the sodium thiocyano acetate.

(b) In accordance with the general procedure described in Example 11(b), the carbamyl compound of this example, the product of (a) supra, is converted into the N-alpha mercapto acetyl meta nitraniline having the formula

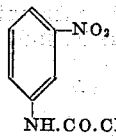

(c) In accordance with the procdure described in Example 11(c), the mercapto compound, the product of (b) supra, is converted into the N-alpha auro mercapto acetyl meta nitraniline. The product is a yellow powder.

(d) In accordance with the procedure described in Example 11(d), the mercapto compound of this example, the product of (b) supra, is converted into the corresponding disulfide having the formula

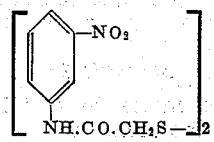

Example 13

N-alpha auro mercapto acetyl para nitraniline having the formula

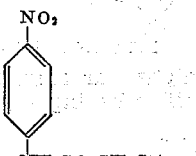

(a) The N-alpha carbamyl mercapto acetyl para nitraniline having the formula

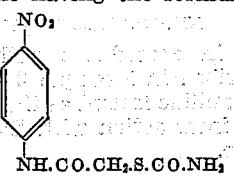

is prepared in accordance with the general method described in Example 3(a), except that para nitraniline is used as the initial starting material for inter-action with the sodium thiocyano acetate.

(b) In accordance with the general procedure described in Example 3(b), the carbamyl compound of this example, the product of (a) supra, is converted into the N-alpha mercapto acetyl para nitraniline having the formula

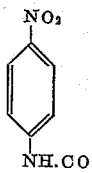

(c) In accordance with the procedure described in Example 3(c), the mercapto compound, the product of (b) supra, is converted into the N-alpha auro mercapto acetyl para nitraniline.

(d) In accordance with the procedure described in Example 3(d), the mercapto compound of this example, the product of (b) supra, is converted into the corresponding disulfide having the formula

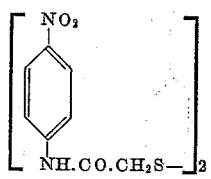

Example 14

N-alpha auro mercapto acetyl ortho anisidine having the formula

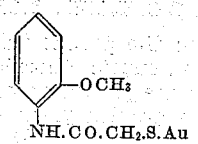

(a) The N-alpha carbamyl mercapto acetyl ortho anisidine having the formula

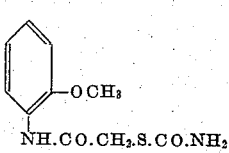

is prepared in accordance with the general method described in Example 3(a) except that ortho anisidine is used as the initial starting material for inter-action with the sodium thiocyano acetate.

(b) In accordance with the general procedure described in Example 3(b), the carbamyl compound of this example, the product of (a) supra, is converted into the N-alpha mercapto acetyl ortho anisidine having the formula

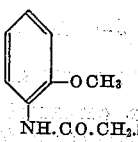

(c) In accordance with the procedure described in Example 3(c), the mercapto compound, the product of (b) supra, is converted into the N-alpha auro mercapto acetyl ortho anisidine.

(d) In accordance with the procedure described in Example 3(d), the mercapto compound of this example is converted into the corresponding disulfide having the formula

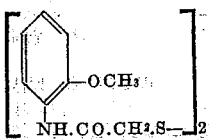

By like procedures, using the meta anisidine as the initial starting material, there are obtained:

N-alpha carbamyl mercapto acetyl meta anisidine having the formula

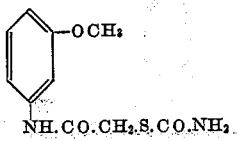

N-alpha mercapto acetyl meta anidisine
N-alpha auro mercapto acetyl meta anisidine
N-alpha di-thio di-acetyl bis meta anisidine.

By following the procedure hereinabove described for the conversion of the mercapto compounds into the auro mercaptides, the N-alpha mercapto acetyl para anisidine is converted into the N-alpha auro mercapto acetyl para anisidine.

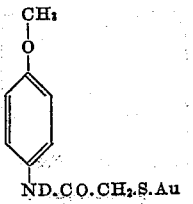

(e) The N-alpha cupro mercapto acetyl ortho anisidine having the formula $$O-CH_3O.C_6H_4.NH.CO.CH_2.S.Cu$$

is prepared from the parent thiol, the product of (b) supra, and cupric chloride in ethanol, in accordance with the procedure of Example 3(e). The product is a grayish green powder.

(f) The zinc mercaptide of N-alpha mercapto acetyl para anisidine having the formula $$[p-CH_3O.C_6H_4.NH.CO.CH_2.S-]_2Zn$$

is prepared as follows: 0.01 mole (1.36 grams) of zinc chloride, $ZnCl_2$, is dissolved in 5 cc. of concentrated ammonia, and this solution is added to a solution of 0.02 mole (3.94 grams) of the parent thiol in 20 cc. of concentrated ammonia. A white precipitate of the zinc mercaptide having the above formula comes down, and is filtered with suction on the following day, washed well with water and ethanol and dried in vacuo over phosphorus pentoxide to produce a white powder.

*Example 15*

N-alpha auro mercapto acetyl ortho phenetidine having the formula

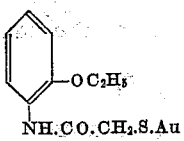

(a) The N-alpha carbamyl mercapto acetyl ortho phenetidine having the formula

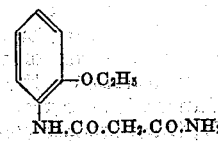

is prepared in accordance with the general method described in Example 3(a) except that ortho phenetidine is used as the initial starting material for inter-action with the sodium thiocyano acetate.

(b) In accordance with the general procedure described in Example 3(b), the carbamyl compound of this example, the product of (a) supra, is converted into the N-alpha mercapto acetyl ortho phenetidine having the formula

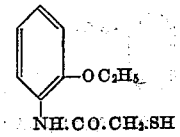

(c) In accordance with the procedure described in Example 3(c), the mercapto compound, the product of (b) supra, is converted into the N-alpha auro mercapto acetyl ortho phenetidine.

(d) In accordance with the procedure described in Example 3(d), the mercapto compound of this example, the product of (b) supra, is converted into the corresponding disulfide having the formula

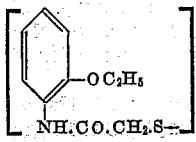

By like procedures, using meta phenetidine as the initial starting material, there are obtained respectively N-alpha carbamyl mercapto acetyl meta phenetidine having the formula

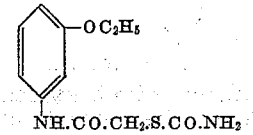

N-alpha mercapto acetyl meta phenetidine.
N-alpha auro mercapto acetyl meta phenetidine.
N-alpha di-thio di-acetyl bis meta phenetidine.

In accordance with the procedure hereinabove described for the conversion of the mercapto compound into the gold mercaptide, the N-alpha mercapto acetyl para phenetidine is converted into the N-alpha auro mercapto acetyl para phenetidine.

*Example 16*

N-alpha auro mercapto acetyl ortho chloro aniline having the formula

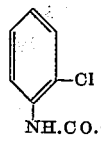

(a) The N-alpha carbamyl mercapto acetyl ortho chloro aniline having the formula

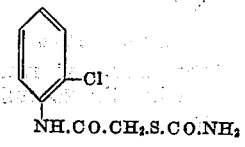

is prepared in accordance with the general method described in Example 3(a) except that ortho chloro aniline is used as the initial starting material for inter-action with the sodium thiocyano acetate.

(b) In accordance with the general procedure described in Example 3(b), the carbamyl compound of this example, the product of (a) supra, is converted into the N-alpha mercapto acetyl ortho chloro aniline having the formula

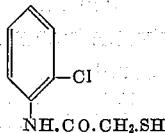

(c) In accordance with the procedure described in Example 3(c) the mercapto compound, the product of (b) supra, is converted into the N-alpha auro mercapto ortho chloro aniline.

(d) In accordance with the procedure described in Example 3(d) the mercapto compound of this example, the product of (b) supra, is converted into the corresponding disulfide having the formula

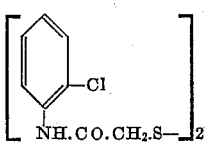

By like procedures, using the para chloro aniline as the initial starting material, there are obtained respectively N-alpha carbamyl mercapto acetyl para chloro aniline having the formula

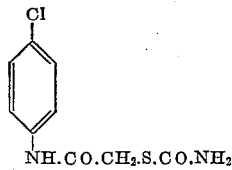

N-alpha mercapto acetyl para chloro aniline
N-alpha auro mercapto acetyl para chloro aniline
N-alpha di-thio di-acetyl bis para chloro aniline.

In accordance with the procedure hereinabove described for the conversion of the mercapto compound into the corresponding gold mercaptide, the N-alpha mercapto acetyl meta chloro aniline is converted into the N-alpha auro mercapto meta chloro aniline having the formula

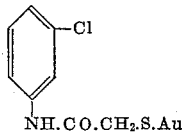

The N-alpha mercapto acetyl meta chloro aniline is prepared from the N-alpha carbamyl mercapto meta chloro aniline in accordance with the procedures hereinabove described. The N-alpha mercapto acetyl meta chloro aniline is converted to the corresponding disulfide in accordance with the procedures hereinabove described.

Example 17

Bis, N,N' alpha auro mercapto acetyl benzidine having the formula

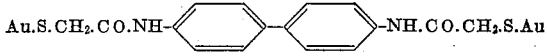

(a) The N,N' alpha carbamyl mercapto acetyl benzidine having the formula

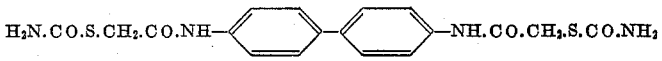

is prepared in accordance with the general method described in Example 3(a) except that benzidine is used as the initial starting material for inter-action with the sodium thiocyano acetate.

(b) In accordance with the general procedure described in Example 3(b), the dicarbamyl compound of this example, the product of (a) supra, is converted into the N,N' alpha mercapto acetyl benzidine having the formula

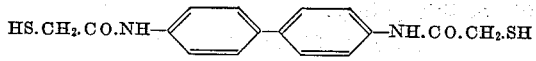

(c) In accordance with the procedure described in Example 3(c), the di mercapto compound, the product of (b) supra, is converted into the N,N' alpha auro mercapto acetyl benzidine.

Example 18

N,N' - bis - [alpha - auro - mercapto - acetyl-] meta phenylene diamine having the formula

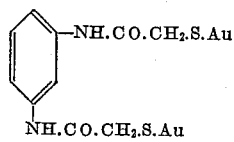

(a) The N,N'-bis-[alpha carbamyl mercapto acetyl] meta phenylene diamine having the formula

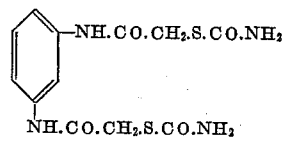

is prepared in accordance with the general method described in Example 3(a) except that meta phenylene diamine is used as the initial starting material for inter-action with the sodium thiocyano acetate.

(b) In accordance with the general procedure described in Example 3(b) the carbamyl compound of this example, the product of (a) supra, is converted into the N,N' bis-[alpha mercapto acetyl]phenylene diamine having the formula

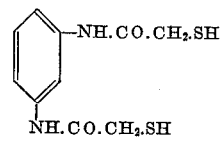

(c) In accordance with the procedure described in Example 3(c), the mercapto compound, the product of (b) supra, is converted into the N,N' bis-[alpha auro mercapto acetyl] meta phenylene diamine.

I claim:

1. Compounds of the group having the type formula:

wherein X is a member of the group consisting of one equivalent of a monovalent and polyvalent heavy metals, Y is a member of the group consisting of hydrogen and —NR.CO.CH₂S.X in which X is defined above, and R is a member of the group consisting of hydrogen, lower alkyl and phenyl lower alkyl.

2. N-alpha, auro-mercapto acetyl ortho-amino biphenyl.

3. N-alpha-auro-mercapto acetyl-N-methyl ortho-amino biphenyl.
4. N-alpha-auro-mercapto acetyl-N-benzyl para amino biphenyl.
5. Bis N,N' alpha argento mercapto acetyl benzidine.

ULRICH WEISS.

REFERENCES CITED

The following references are of record in the file of this patent:

UNITED STATES PATENTS

| Number | Name | Date |
|---|---|---|
| 2,036,208 | Feldt et al. | Apr. 7, 1936 |
| 2,270,183 | Cook et al. | Jan. 13, 1942 |
| 2,384,811 | Coleman et al. | Sept. 18, 1945 |
| 2,412,700 | Weissburger et al. | Dec. 17, 1946 |
| 2,431,910 | Blout et al. | Dec. 2, 1947 |
| 2,451,841 | Lewenstein | Oct. 19, 1948 |

FOREIGN PATENTS

| Number | Country | Date |
|---|---|---|
| 210,886 | Germany | June 18, 1909 |
| 555,141 | Great Britain | Aug. 5, 1943 |

OTHER REFERENCES

Beckurts et al., "Jour. fur prakt. Chemie," vol. 174 (neue folge 66), pages 172 to 193 (1902).